United States Patent
Morovic et al.

(10) Patent No.: US 9,936,102 B2
(45) Date of Patent: Apr. 3, 2018

(54) COLOR MAPPING MODELING PRINTING DEVICE PERTURBATIONS

(71) Applicant: HEWLETT-PACKARD DEVELOPMENT COMPANY, L.P., Houston, TX (US)

(72) Inventors: Jan Morovic, Colchester (GB); Peter Morovic, Sant Cugat del Valles (ES); Juan Manuel Garcia Reyero Vinas, Sant Cugat del Valles (ES); Marti Rius Rossell, San Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/305,627

(22) PCT Filed: Apr. 25, 2014

(86) PCT No.: PCT/EP2014/058516
§ 371 (c)(1),
(2) Date: Oct. 20, 2016

(87) PCT Pub. No.: WO2015/161897
PCT Pub. Date: Oct. 29, 2015

(65) Prior Publication Data
US 2017/0048421 A1    Feb. 16, 2017

(51) Int. Cl.
*H04N 1/60*    (2006.01)
*H04N 1/52*    (2006.01)
*H04N 1/54*    (2006.01)

(52) U.S. Cl.
CPC ............ *H04N 1/6019* (2013.01); *H04N 1/52* (2013.01); *H04N 1/54* (2013.01); *H04N 1/6008* (2013.01); *H04N 1/6016* (2013.01); *H04N 1/6058* (2013.01)

(58) Field of Classification Search
None
See application file for complete search history.

(56) References Cited

U.S. PATENT DOCUMENTS

| 6,698,860 | B2 * | 3/2004 | Berns ....................... H04N 1/54 347/15 |
| 7,053,910 | B2 * | 5/2006 | Newman ............... H04N 1/6052 345/604 |
| 7,084,991 | B2 | 8/2006 | Miguel et al. |
| 7,173,733 | B2 | 2/2007 | Nino et al. |
| 7,710,597 | B2 | 5/2010 | Edge |

(Continued)

OTHER PUBLICATIONS

Monga, et al. Design of Tone-Dependent Color-Error Diffusion Halftoning SYstems. IEEE Transactions on Image Processing vol. 16 No. 1 Jan. 2007.

*Primary Examiner* — Scott A Rogers
(74) *Attorney, Agent, or Firm* — HP Inc. Patent Department

(57) ABSTRACT

A method for color mapping is disclosed. A color mapping is generated based on an imaging model and a color model for an imaging device. The imaging model allows a set of perturbations to be modelled. A set of metamers is determined for one or more colors. For each metamer, at least the imaging model is used to estimate a color output with at least one modelled perturbation. The color outputs are used to select a metamer from the set to be used for the color mapping.

15 Claims, 8 Drawing Sheets

(56) References Cited

U.S. PATENT DOCUMENTS

| | | |
|---|---|---|
| 8,049,929 B2 | 11/2011 | Loce et al. |
| 8,068,255 B2 * | 11/2011 | Stokes .................... H04N 1/46 358/1.9 |
| 8,482,797 B2 * | 7/2013 | Mahy .................. H04N 1/6033 358/1.16 |
| 9,313,360 B2 * | 4/2016 | Morovic ............ H04N 1/32309 |
| 2003/0169438 A1 | 9/2003 | Velde et al. |
| 2007/0291312 A1 | 12/2007 | Kaneko et al. |
| 2008/0030787 A1 | 2/2008 | McElvain |
| 2011/0096365 A1 | 4/2011 | Benedicto et al. |
| 2013/0182266 A1 | 7/2013 | Fu et al. |
| 2017/0048420 A1 * | 2/2017 | Morovic .................. G01J 3/46 |
| 2017/0126931 A1 * | 5/2017 | Morovic ............... H04N 1/405 |

* cited by examiner

COLOR MAPPING MODELING PRINTING DEVICE PERTURBATIONS

BACKGROUND

Color is a concept that is understood intuitively by human beings. However, it is a subjective phenomenon rooted in the retinal and neural circuits of a human brain. Typically, "a color" is a category that is used to denote similar visual perceptions; two colors are said to be the same if they produce a similar effect on a group of one or more people. As such, the concept of quantifying color (or 'colorimetry') presents a challenge for those constructing technical devices. Different devices in an imaging system may output a supposedly common color in different ways, leading to a perceived color discrepancy. Moreover a particular imaging device may display color variations due to fluctuations and perturbations in the imaging hardware.

BRIEF DESCRIPTION OF THE DRAWINGS

Various features and advantages of certain examples will be apparent from the detailed description which follows, taken in conjunction with the accompanying drawings, which together illustrate, by way of example only, a number of features, and wherein.

DETAILED DESCRIPTION

Figure 1:
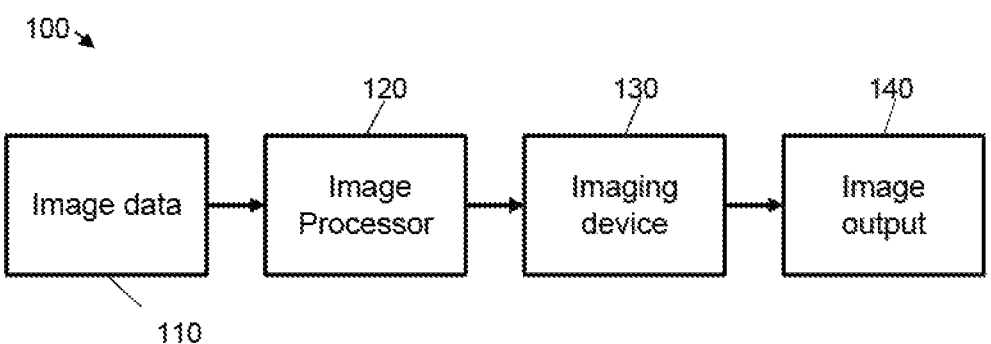
FIG. 1 is a schematic illustration showing components of an imaging system.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color mapping in an imaging system. Color mapping is a process by which a first representation of a given color is mapped to a second representation of the same color. Although "color" is a concept that is understood intuitively by human beings, it can be represented in a large variety of ways. For example, in one case a color may be represented by a power or intensity spectrum across a range of visible wavelengths. However, this is a high dimensionality representation and so typically a color model is used to represent a color at a lower dimensionality. For example, certain color models make use of the fact that color may be seen as a subjective phenomenon. In this case, a "color" may be defined as a category that is used to denote similar visual perceptions; two colors are said to be the same if they produce a similar effect on a group of one or more people. These categories can then be modelled using a lower number of variables.

Within this context, a color model may define a color space. A color space in this sense may be defined as a multi-dimensional space, wherein a point in the multi-dimensional space represents a color value and dimensions of the space represent variables within the color model. For example, in a Red, Green, Blue (RGB) color space, an additive color model defines three variables representing different quantities of red, green and blue light. Other color spaces include: a Cyan, Magenta, Yellow and Black (CMYK) color space, wherein four variables are used in a subtractive color model to represent different quantities of colorant, e.g. for a printing system; the International Commission on Illumination (CIE) 1931 XYZ color space, wherein three variables ('X', 'Y' and 'Z' or tristimulus values) are used to model a color, and the CIE 1976 ($L^*$, $a^*$, $b^*$—CIELAB) color space, wherein three variables represent lightness ('L') and opposing color dimensions ('a' and 'b'). Certain color spaces, such as RGB and CMYK may be said to be device-dependent, e.g. an output color with a common RGB or CMYK value may have a different perceived color when using different imaging systems.

When working with color spaces, the term "gamut" refers to a multi-dimensional volume in a color space that represents color values that may be output by the imaging system. A gamut may take the form of an arbitrary volume in the color space wherein color values within the volume are available to the imaging system but where color values falling outside the volume are not available. The terms color mapping, color model, color space and color gamut, as explained above, will be used in the following description.

Certain examples described herein relate to imaging systems and methods. In particular, certain examples described herein address the problems of be perturbations or fluctuations within an imaging system. These perturbations or fluctuations may giving rise to imaging errors. In order to address these imaging errors certain examples described herein provide a color mapping. The choice of color mapping may be based on the selection of a particular metamer from a set of metamers matching a color to be mapped. In these cases, the selection of the metamer is based upon whichever metamer is least susceptible to one or more modelled fluctuations and perturbations.

FIG. 1 shows an exemplary imaging system 100. Certain examples described herein may be implemented within the context of this imaging system. In the example of FIG. 1, image data 110 is passed to an image processor 120. The image processor 120 process image data 110. The image data 110 may comprise color data as represented in an input color space, such as pixel representations in an RGB color space. The image processor 120 maps the color data from the input color space to an output color space for use by an imaging device 130 to generate an image output 140.

Figure 2:
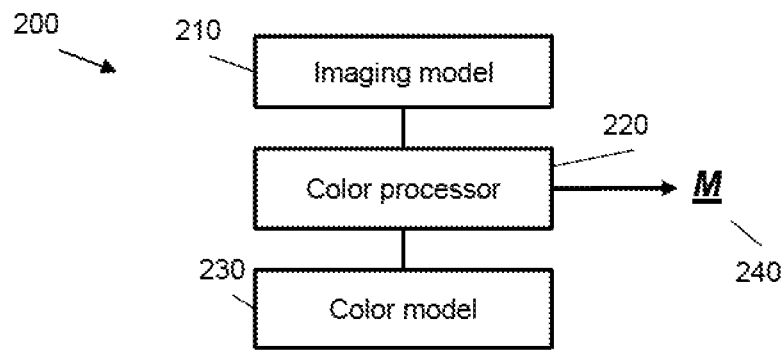
FIG. 2 is a schematic diagram showing a set of components of an image processor according to an example.

FIG. 2 shows three components of an image processing system 200 according to an example. In one case, these components may form part of the image processor 120 of FIG. 1; in another case, they may be implemented separately. Image processing system 200 comprises a color processor 220 which is arranged to obtain parameters for a color model 230. In one case, the color processor 220 may be arranged to derive parameters for the color model 230 from test data; in another case parameters for the color model 230 may be pre-computed and supplied to the image processing system 200. The color model 230 is used to indicate a color gamut for the imaging device, e.g. a set of color values in a first color space that can be output by the imaging device. The first color space may comprise a color space based on one of a Red, Green, Blue (RGB) color space, a CIE Lab color space and a CIE XYZ color space. In one case, the first color space may comprise a Yule-Nielsen modified XYZ color space.

Color processor 220 is arranged to output a color mapping 240. The color mapping 240 may be the color mapping that is used by the image processor of FIG. 1. In order to generate the color mapping 240, color processor 220 is provided with an imaging model 210. The imaging model 210 provides data which is used by color processor 220 together with a color model 230 to generate color mapping 240. The imaging model 210 is arranged to model properties of an imaging device, such as imaging device 130 in FIG. 1. The properties to be modelled typically relate to hardware properties of the imaging device. The color model 230 is also arranged to predict an output color value of the imaging device using the imaging model 210. The predicted color value may reside in in the first color space.

In particular, in the generation of color mapping 240, color processor 220 is arranged to compute a set of metamers in a second color space that match a particular sampled color from the indicated color gamut. In this case, a set of metamers represent color values in the second color space that map to a common color value in the first color space. As described in more detail below the second color space may comprise a Neugebauer Primary area coverage (NPac) space. The color processor 220 is arranged to compute a color error for each metamer in the set. A color error is determined by estimating, for a selected metamer, one or more different output colors with different sets of operating parameters in the imaging model. In one case, one set of operating parameters may comprise a set of operating parameters without one or more perturbations and another set of operating parameters may comprise a set of operating parameters with one or more perturbations. In another case, each set of operating parameters may comprise a different state of the imaging device and may include one or more of at least one perturbed state and at least one nominal state. Each output color is estimated by applying the imaging model 210 and the color model 230. Each output color may be represented in the first color space. In the set of metamers, a particular metamer may be selected based on the set of estimated color errors. For example, a metamer with the lowest color error value may be selected; in another example, a metamer may be selected based on an optimization (e.g. a minimization) of a plurality of color error metrics, each error metric being associated with a different state of the imaging device. This metamer is used by the color processor to construct the color mapping 240. For example, for the sampled color, the metamer may represent an output color value in the second color space for the mapping. In use, the color processor 220 may be arranged to repeat this process for a plurality of sampled colors in order to build up a color mapping 240 with a plurality of nodes. In this case, the plurality of selected metamers form a color mapping that is least susceptible to the perturbation and/or fluctuations of the imaging device.

Figure 3:
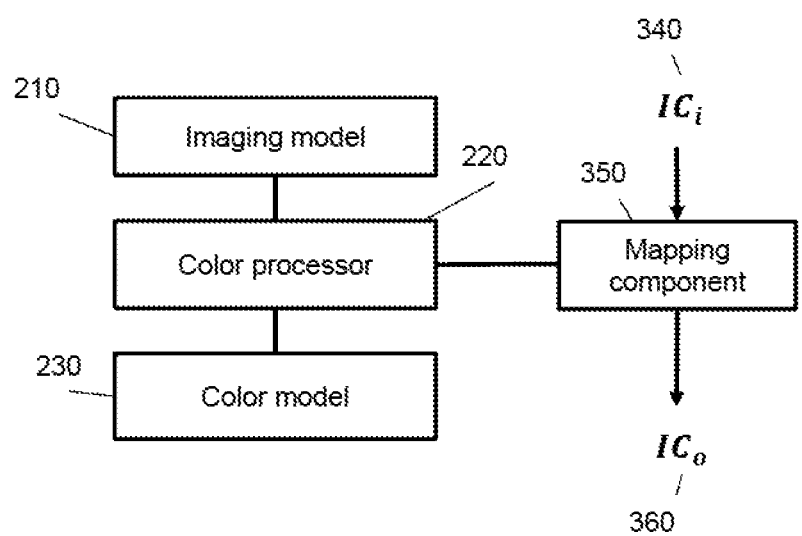
FIG. 3 is a schematic diagram showing a mapping component according to an example.

FIG. 3 shows a mapping component 350 that is arranged to use a color mapping 240 as generated by the color processor 320. Mapping component 350 is arranged to perform a mapping between an input color space $IC_i$ 340 and an output color space $IC_O$ 360. The mapping component 350 may implement the color mapping performed by the image processor 120, i.e. from an input color space associated with input image data 110 to an output color space for production of an image output 140 by imaging device 130. In these cases the output color space comprises the second color space, e.g. an NPac space, as described above. The input color space may comprise the first color space or another color space. For example, the input color space may comprise an RGB color space that is mapped to an NPac space, wherein the mapping is representative of a mapping via Yule-Nielsen modified XYZ color space. This is explained in more detail below with reference to FIG. 7.

In one implementation, the imaging device is a printing system. In this case, an image output may comprise colored inks deposited on a substrate. The substrate may be paper, fabric, plastic or any other suitable print medium. The printing system may comprise a halftone printing system. In this case, a halftone image output on a printing medium comprises a plurality of pixels wherein the spatial density of the pixels controls the colorimetry of area of the image. A halftone pixel comprises one or more droplets of ink fluid released for example, by the nozzles in a printing head of a printing device. A plurality of halftone pixels results in a halftone image comprising regions of varying colorimetry. Although certain printing device examples are described with reference to one or more colorant levels, it should be understood that any color mappings may be extended to other printing fluids such as glosses and/or varnishes that may be deposited in a printing system and that may alter a perceived output color.

As described above, the output color space in one implementation is an NPac color space. An NPac color space provides a large number of metamers for a given colorimetry, e.g. a large number of output color values that map to a common input color value in one or more of RGB, XYZ and Lab color space. This facilitates the generation of alternate color mappings that are more robust in the presence of perturbations and fluctuations.

An NPac represents a distribution of one or more Neugebauer Primaries (NPs) over a unit area. For a binary (bi-level) printer, an NP is one of $2^k$ combinations of k inks within the printing system. For example, if a printing device uses CMY inks there can be eight NPs. These NPs relate to the following colorant combinations: C, M, Y, C+M, C+Y, M+Y, C+M+Y, and W (white or blank indicating an absence of ink). In other printing systems there may be greater or fewer NPs depending on the available colorants; a CMY printing system is used herein for ease of explanation. Other examples may also incorporate multi-level printers, e.g. where print heads are able to deposit N drop levels, in this case an NP may comprise one of $N^k$ combinations of k inks within the printing system.

Figure 4:
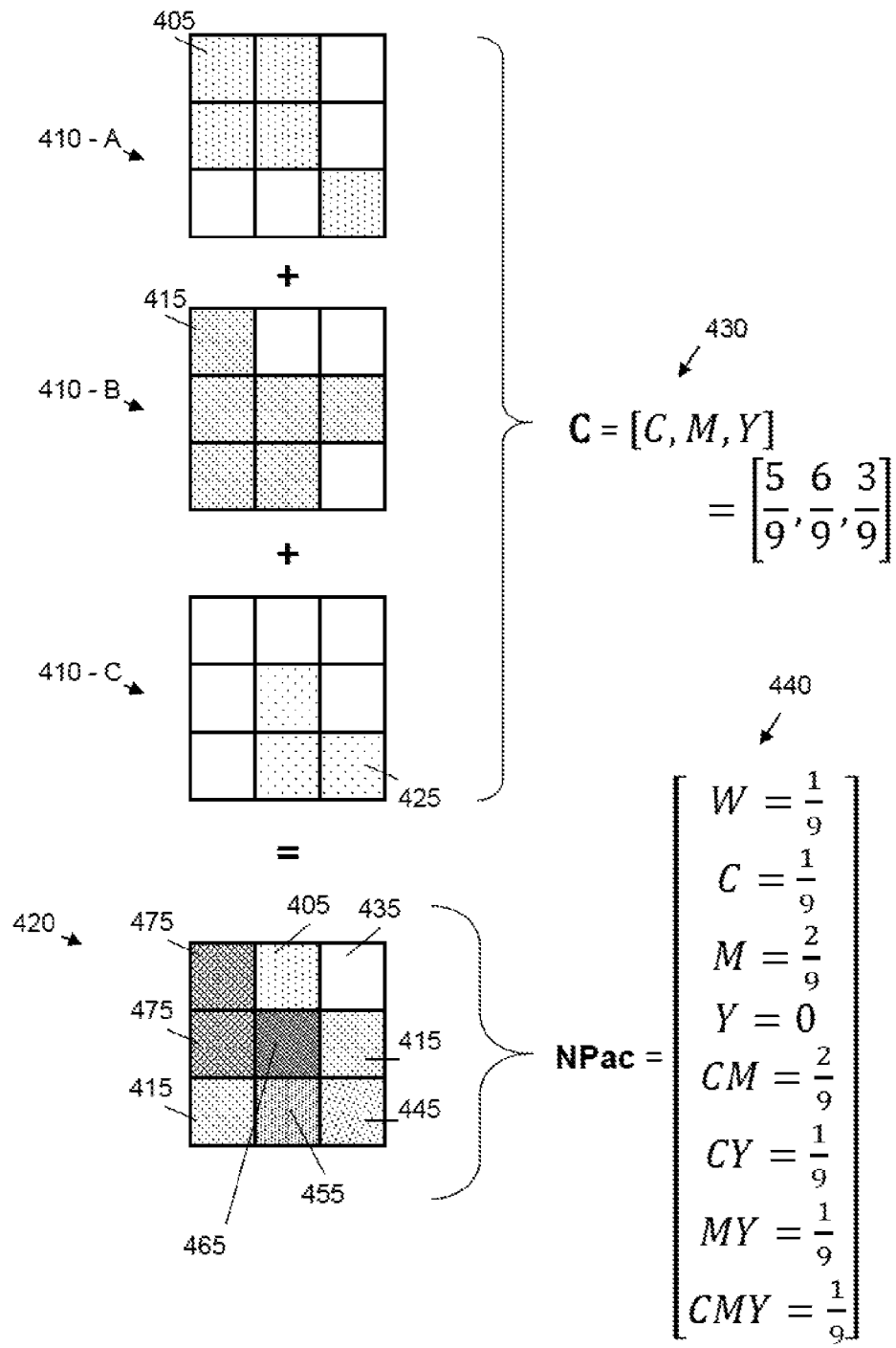
FIG. 4 is a schematic diagram showing an example of an Neugebauer Primary area coverage (NPac) vector.

FIG. 4 shows an example NPac vector 440 for a CMY printing system. This example shows a unit area for a printed image that comprises a three-by-three pixel area 420. In implementations the unit area for an NPac may depend on the resolution of the printing system (e.g. in dots per square inch). The unit area may map to one or more pixels of an input image. In this example, the NPac vector defines the area coverages of eight NPs for the unit area. For example, in this case the area coverages comprise, for a square of nine pixels: one pixel of White (W) (435); one pixel of Cyan (C) (405); two pixels of Magenta (M) (415); no pixels of Yellow (Y); two pixels of Cyan+Magenta (CM) (475); one pixel of Cyan+Yellow (CY) (445); one pixel of Magenta+Yellow (MY) (455); and one pixel of Cyan+Magenta+Yellow (CMY) (465). As can be seen, the component values of each NPac vector sum to one, i.e. to represent the total area of the unit area.

As shown in FIG. 4, the NPac vector 440 is equivalent to an additive print operation with three colorants C, M and Y. For the Cyan colorant 405 five pixels are to be printed as shown by the pattern 410-A. For the Magenta colorant 415 six pixels are to be printed as shown by the pattern 410-B. For the Yellow colorant 425 three pixels are to be printed as shown by the pattern 410-C. In this example, each colorant is to be overprinted, e.g. each pattern 410-A to C is to be printed in order within a three-by-three pixel area. A colorant vector 430 representing the different proportions is also shown.

Although an example three-by-three pixel area is shown in FIG. 4, this is for ease of explanation; the unit area may be of any size and/or there may be multiple levels of units. For example, each pixel of a halftone output may have a corresponding NPac vector. In this case, in a binary printing system, for a halftone pixel, one NP may have a value of 1 and the other NPs may have a value of 0. However, this pixel may form part of a halftone neighborhood, e.g. a three-by-three area as shown, that itself is defined by an NPac vector. In this case errors between a proposed and actual NPac vector may be propagated to neighboring areas. Likewise, although CMY system is used for ease of explanation, other printing systems may be used.

In certain examples, a color gamut as indicated by the color model 230 may be ink limited. The concept of an ink-limited color gamut will now be described with reference to FIGS. 5A and 5B.

Figure 5A:
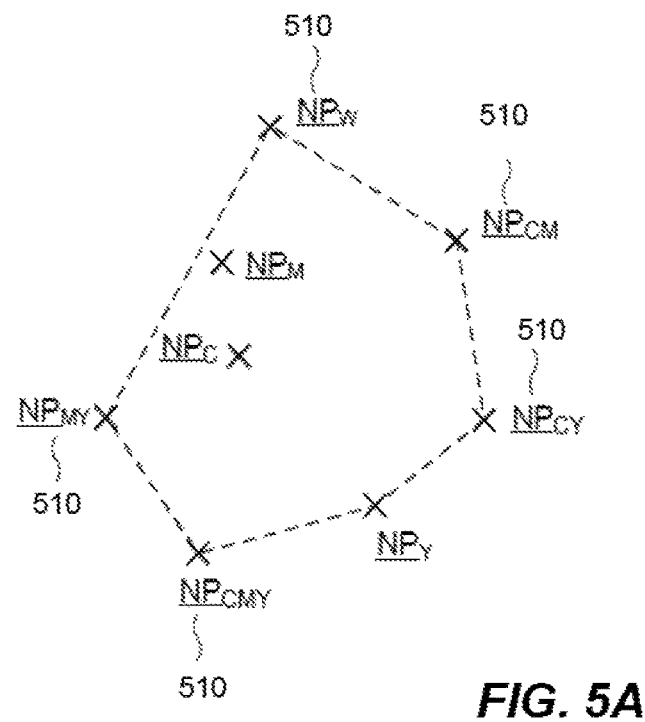
FIG. 5A is a schematic diagram of convex region defined by a set of NPac vectors according to an example.
Figure 5B:
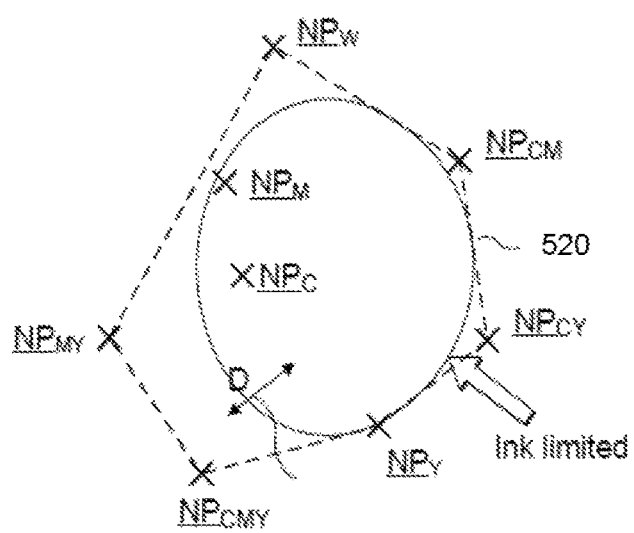
FIG. 5B is a schematic diagram of a region defined by a set of NPac vectors with an ink-limited sub-region, according to an example.

FIG. 5A shows a schematic diagram of NPac vectors in an N-dimensional color space in which each point is a plot in the color space. In the example of a printing system it will typically be the case that certain colors fall outside the printable gamut due to limitations of a printing device. For example, a subset of a gamut that is printable may depend on ink limits of the substrate onto which the printing device is to print. Once characteristics of a substrate are taken into account, this may cause a reduction in the number of colors that are printable. An example of the ink-limited space is shown in FIG. 5B. In FIG. 5B, ink limits are incorporated into the color model 230 to indicate a reduced volume color gamut that represents the printable colors of a printing system.

In the case where the imaging device is an ink-jet color printer, the imaging model 210 of FIG. 2 may be a model representing one or more properties of the ink-jet printer. For example, the imaging model 210 may comprise statistical properties of ink droplets deposited on substrate such as dot size, dot shape and dot placement statistics. These may be modelled using data on drop placement error and drop weight variations. In this case, perturbations in imaging device hardware may be modelled as variations in these statistical properties. For example, a perturbation may be modelled as a random variation in one or more of the statistical properties within a predetermined range, e.g. random variations in dot size within the range+/−10%. In certain examples, a perturbation may be modelled as a systematic, non-random variation and/or a systematic variation with additional random noise. In certain examples, imaging model 210 may include operational properties of the imaging device. For example, in the case of an ink-jet printer the imaging model may include information about missing printer nozzles, misalignment of nozzles or pen health. These properties may be determined either manually or may be determined using diagnostic information available to the printing system. In one case, properties of a printing system in one or more of a default and perturbation state may be determined by inspecting a printed output of the printing system, e.g. by visual inspection and/or automated image-capture of the printed output. In certain cases, the imaging model 210 may be periodically updated and/or updated in real-time or near real-time. In the latter case, the imaging model 210 may represent a real-time model of the imaging device, e.g. incorporate current data indicating the state of the imaging device. In one case, an imaging model 210 allows for the simulation of dot structure on a substrate and a range of perturbations from a digital halftone, e.g. from an NPac value.

In one implementation of FIGS. 2 and 3, the color model 230 may comprise one or more of the Kubelka-Munk model of drop overprint prediction, the Yule-Nielsen model for optical dot gain prediction and the Neugebauer model for the optical integration of print structure below the human visual system's resolving power. In a case where the imaging device comprises an ink-jet printer, the color model 230 may apply each of the Kubelka-Munk, Neugebauer and Yule-Nielsen models in that order to predict a color, e.g. a color value in the first or second color space, from a drop-on-substrate simulation of the ink-jet printer as provided by the imaging model 210.

In one case, a color model 230 may be generated by printing and measuring the NPs output by the imaging system. In one example, test portions representing NPs are measured using a spectrophotometer that outputs a reflectance spectrum for each test portion. The measured spectral reflectance values may then be used to derive parameters for the color model 230. In one case measured NPs comprise those that are within ink limits, or comprise NPs in combination with other within-ink-limit NPs (e.g. the blank substrate) so as to print a number of test patches involving an over-the-ink-limit NP while not exceeding the ink limit.

In one case, a (spectral) Neugebauer model enables a reflectance value, $\hat{R}_E(\lambda)$, for a given wavelength, $\lambda$, to be estimated using the following equation:

$$\hat{R}_{E-SN}(\lambda) = \sum_{p=0}^{L} A_p R_p(\lambda)$$

where: $A_p$ is an area coverage for a given NP p; $R_p$ is a reflectance value, at given wavelength $\lambda$, of given NP p at full area coverage (e.g. 100%); and wherein there are L NPs. The Neugebauer model may be extended using the Yule-Nielsen model to take account of light penetration and scattering in a print medium. To do this a power term is added to the above Neugebauer model equation:

$$\hat{R}_{E-YNSN}(\lambda) = \left[\sum_{p=0}^{L} A_p R_p(\lambda)^{1/y(\lambda)}\right]^{y(\lambda)}$$

where y is, for a given wavelength, a parameter accounting for light spreading in a given print medium. Typically, one or more values for y are calculated using a non-linear optimization. Finally, estimated spectral reflectance values for a given wavelength may be further modified using a Kubelka-Munk model to take into account diffuse reflection at scattering surfaces, e.g. absorption and scattering characteristics of ink on a print medium. In this case the measured spectral reflectance values may be used to obtain absorption and scattering coefficients for the Kubelka-Munk model, these then being used to modulate an estimated spectral reflectance value resulting from the Yule-Nielsen Spectral Neugebauer model.

In the case described above, the color model 230 apply each of the, Neugebauer, Yule-Nielsen and Kubelka-Munk models in that order to output an estimated spectral reflectance value for a given wavelength $\hat{R}_E(\lambda)$. By determining parameters for the range of visible wavelengths, the color model 230 may be used to estimated reflectance spectrum. The input to the color model 230 may comprise a set of area coverages for a particular set of NPs. The input to the color model 230 may be derived and/or modified based on the imaging model 210. For example, the imaging model 210 may define and/or modify area coverage values and/or the presence of certain NP based on one or more modelled perturbations.

Certain methods will now be described that simulate the color of a halftone pattern that would result when it is output on a given imaging system. These methods use an imaging model, which takes a digital halftone pattern and which predicts the corresponding color that would result from it being output on the imaging system where perturbations are applied to a nominal state. The predicted color is used to select a robust digital halftone pattern.

Figure 6:
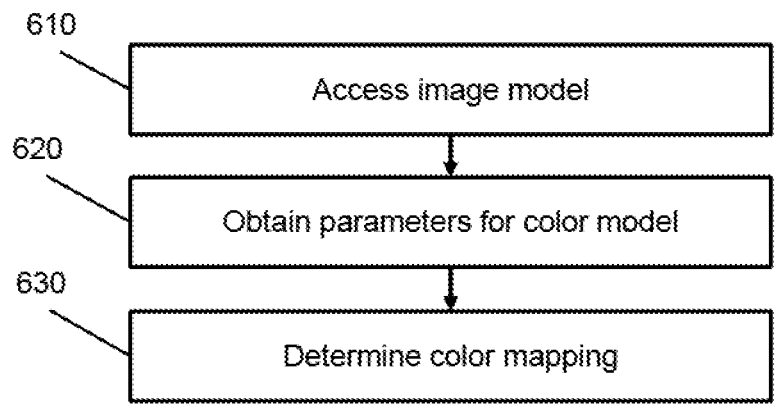
FIG. 6 is a flow chart showing a method of determining a color mapping from imaging data.

FIG. 6 shows a method for determining a color mapping based on an imaging model and a color model according to an example. This method may be implemented by the color processor 220 of FIG. 2. At block 610 an imaging model is accessed. This may comprise accessing a pre-computed imaging model that models the operation of an imaging system such as a printer device. The imaging model may comprise the imaging model 210 as described above. At block 620 one or more parameters are obtained for a color model. This may comprise accessing a pre-computed color model. The color model may comprise the color model 230 as described above. The imaging model and the color model are used to predict an output color for a particular digital halftone pattern. At block 630 a color mapping is determined. The color mapping is between one or more color values in an input color space, e.g. a color space used by an input image, and one or more digital halftone patterns.

In one case the digital halftone pattern is expressed as one or more NPac values, i.e. a set of values that dictate the spatial distribution of one or more colorants and/or colorant combinations over a unit area. The color mapping is determined by selecting a particular digital halftone pattern from a set of digital halftone patterns. Each digital halftone pattern in the set of digital halftone patterns may have a common colorimetry, e.g. may be represented by a common tristimulus value in an XYZ-based color space. Two or more output colors may be determined for each digital halftone pattern in the set based on the imaging and color model; wherein each output color is determined using a defined state of the imaging system. In one example, at least one state models a perturbation and/or fluctuation of the imaging system, e.g. models one or more deviations from a set of default operating parameters. In one case, one of the states may be a nominal state and another state may be a perturbed state. In another case, each of the states may model a particular set of perturbations, e.g. may represent different perturbation states and/or applied perturbation parameters. A distance metric between the two or more colors may be used as an imaging metric to select a robust digital halftone pattern in the presence of perturbations. In a two state case, the distance metric may be a color difference; in examples where multiple states are considered one or more distance metrics may be analyzed as a set of difference statistics to select a particular digital halftone pattern. For example, in the latter case, a multidimensional optimization may be applied to select a digital halftone pattern that minimizes a set of perturbation errors and/or a perturbed state that results in a maximum imaging error may be used as a reference perturbed state to minimize, e.g. the digital halftone pattern that minimizes a color difference for the reference perturbed state.

Figure 7:
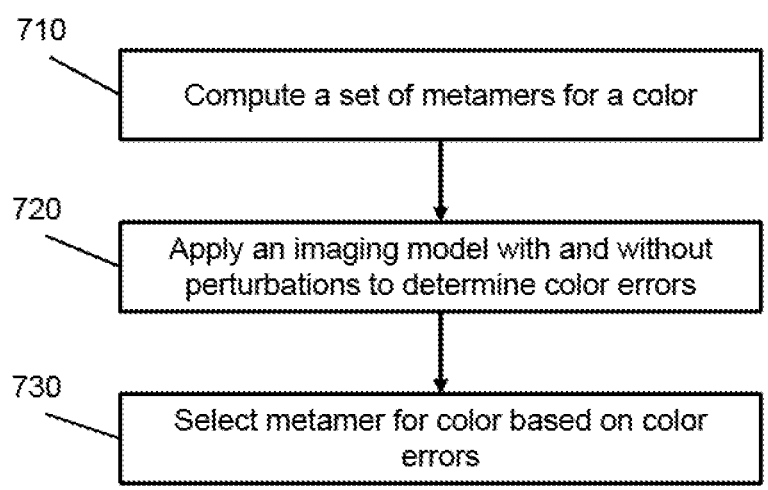
FIG. 7 is a flow chart showing a method for determining a set of output colors from applying an imaging model to a set of metamers.

FIG. 7 shows in more detail an example method for selecting a metamer from a set of metamers based on a color error. The selection of a metamer in this manner, by way of an imaging model and a color model, indicates a digital halftone pattern that maintains its color state in the presence of perturbations or fluctuations of the imaging system. At block 710 a set of metamers is computed for a given color. In one case, a color gamut for the imaging device may be determined using the color model. The color gamut may be determined based on a nominal operating state as represented by the imaging model. The color gamut may incorporate ink limits. The color gamut may be defined in a colorimetric color space, e.g. by a volume in in an XYZ-based color space. A given color may be selected by sampling the color gamut.

In one case, metamers are selected for a given color by identifying convex combinations of NP colorimetries in a Yule-Nielsen modified XYZ (i.e. XYZ") color space that match it. Each of these convex combinations represents an NPac vector for digital halftone pattern, wherein convex weights for the combinations match relative area coverage values in the NPac vector. For example, as a calorimetric color space typically has three dimensions, NPs comprise points within this calorimetric space and relative area coverage values may be determined based on a barycentric coordinate system, e.g. of a point in the color space located in the color gamut between the NPs. In this example, the set of all NPacs matching a sampled color is the color's metamer set.

Returning to FIG. 7, at block 720 the imaging model and the color model, e.g. the data accessed at blocks 610 and 620, are applied to each metamer in the computed set of metamers matching a given color. In one case, a digital halftone pattern for each metamer, e.g. as represented by an NPac vector, is input to the imaging model. The imaging model is then applied with and without a set of modelled perturbations to generate a simulated image output. This image output may represent a simulated print output. The color model is then applied to the simulated image output to determine a predicted output color. The predicted output color may be represented in a colorimetric space, e.g. an XYZ-based color space. For example, when perturbations are modelled this may affect the area coverages and/or present NPs of a simulated image output. This in turn affects the output color, as predicted using the color model.

At block 730 a metamer is selected from the set of metamers based on a color error generated by comparing a predicted output color associated with the metamer for a case with and a case without application of one or more modelled perturbations. For example, if a predicted output color is determined in an XYZ-based color space, then a CIE delta E (e.g. ΔE2000) difference metric may be used to calculate a color difference between an output color without modelled perturbations and an output color with modelled perturbations. This difference metric may be used as a measure of the robustness of the digital halftone pattern. As such, the metamer with the lowest difference metric may be selected. This metamer, e.g. an NPac vector representative of the digital halftone pattern, may then be used as an output for a color mapping with the sampled color as an input. By repeating the method of FIG. 7 for a plurality of sampled colors in the color gamut, a number of nodes for the color mapping may be determined. The color mapping may then be used to map to a digital halftone pattern.

Figure 8:
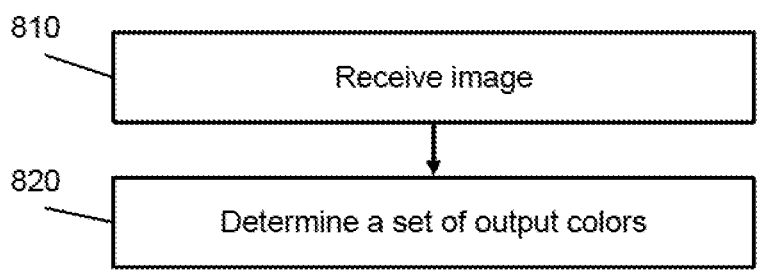
FIG. 8 is a flow chart showing a method of determining a set of output colors from received image data.

FIG. 8 shows a method of using a color mapping, such as the color mapping constructed by the methods of FIGS. 6 and 7, to provide a robust digital halftone pattern for imaging. At block 810 an image is received. This image may comprise image data 110. The image comprises one or more input colors, e.g. ROB pixel values. At block 820, a set of output colors are determined using the color mapping. As described above, each output color in the color mapping has been selected based on a comparison of one or more color properties for each of a plurality of metamers, wherein each of the plurality of metamers maps to a common input color (e.g. either directly or by a mapping to a common colorimetric color value). The comparison is between an output color of a selected metamer with a modelled perturbation and an output color of the selected metamer without the modelled perturbation. Each output color may comprise a color determined by a digital halftone pattern, e.g. an NPac vector.

Figure 9:
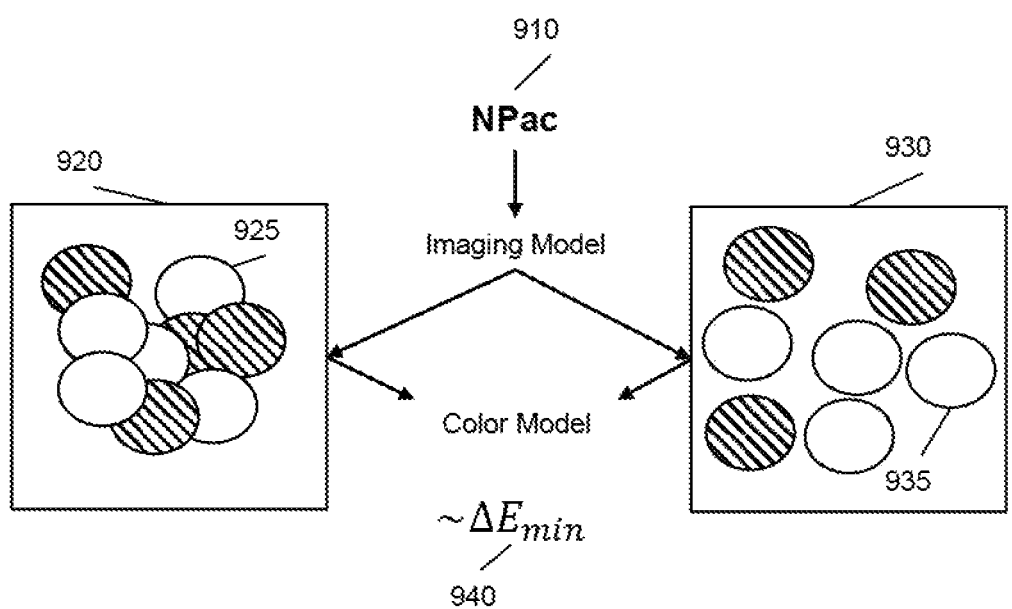
FIG. 9 is a schematic diagram showing two regions on a substrate with and without the application of print perturbations, according to an example.

FIG. 9 illustrates the process of determining a color error. In this example, an NPac vector, representing a particular metamer, is input to the imaging model. In this example, the output of the imaging model comprises two simulated print outputs. FIG. 9 shows the resulting differences exhibited between application of halftone patterns 925, 935 printed from NPac vectors 910 on a simulated substrate under nominal conditions 920 and perturbed conditions 930. As can be seen simulated outputs 925 and 935 differ due to the modelling of perturbations, e.g. even though the desired area coverages are set by the NPac vector, the actual output area coverages vary due to the modelled perturbations. The simulated outputs are then input to the color model, wherein a colorimetric color value for each set of conditions is calculated. A difference between these colorimetric color values is then calculated to provide a $\Delta E_{min}$ value 640. When the process illustrated in FIG. 9 is repeated for a plurality of NPac vectors, a minimal ΔEvalue may be determined for NPacs in the metamer set. The NPac associated with this minimal ΔE value is then selected as the NPac for the color mapping.

In one example, the color mapping, e.g. color mapping 240 or that used in the method of FIG. 8, may comprise a look-up table. If a sampled color in the color gamut is a color value in a colorimetric space, e.g. an XYZ-based color space, then the result of the method of FIG. 6 may comprise a XYZ"-to-NPac color mapping. If an image comprises image data represented in a color space that is not an XYZ-based color space, then a complete color mapping may be generated by concatenating a color mapping from this other space to an XYZ-based color space and the existing color mapping from the an XYZ-based color space to a digital halftone pattern space. For example, a RGB-to-XYZ" color mapping may be obtained and concatenated with a XYZ"-to-NPac color mapping to generate a RGB-to-NPac color mapping. This resultant color mapping may be expressed as the example look-up table shown in FIG. 10.

Figure 10:
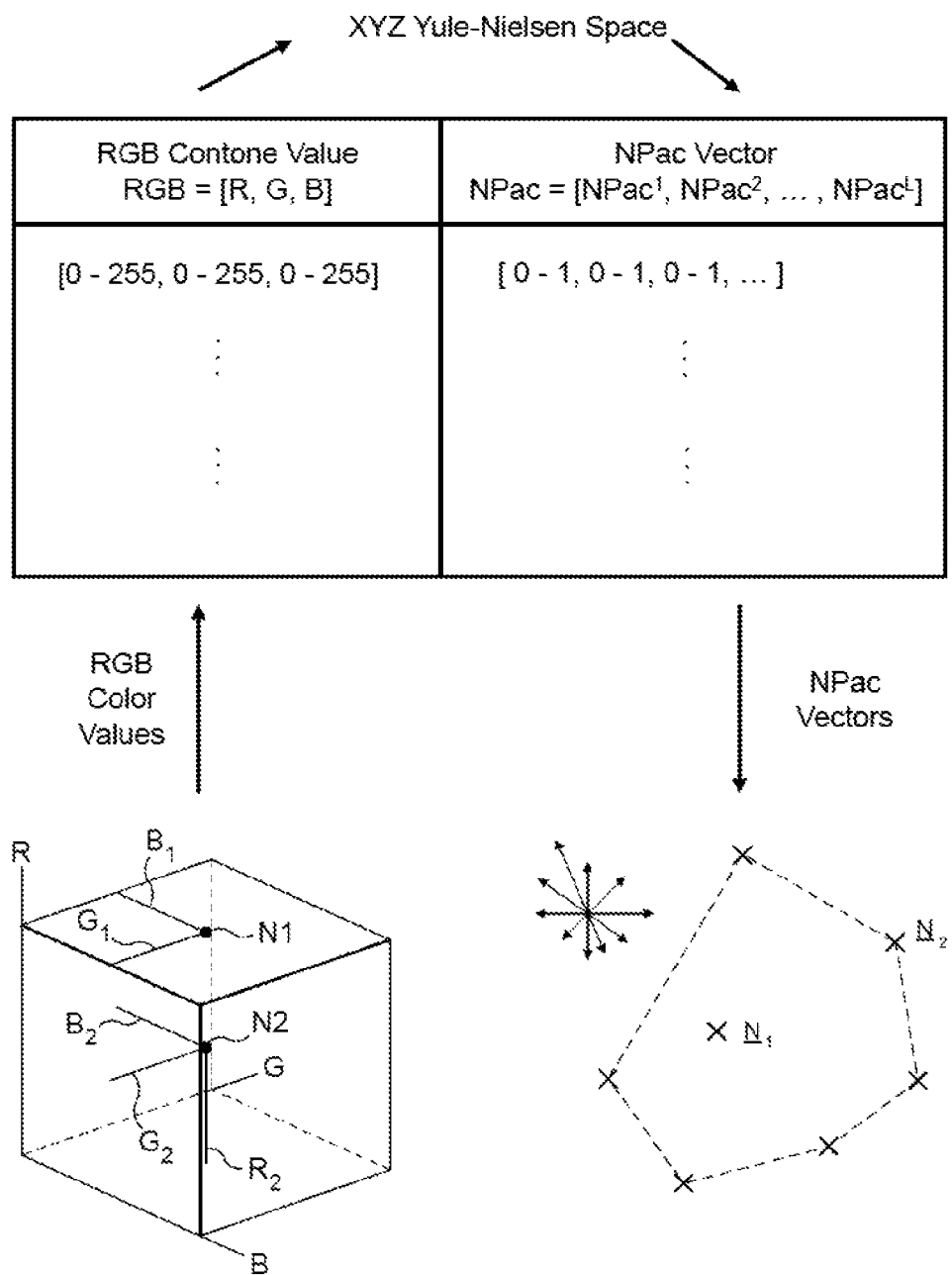
FIG. 10 is a schematic illustration showing a look-up-table (LUT) for color mapping from RGB values to NPac vectors according to an example.

FIG. 10 shows an example look-up table for RGB-to-NPac color mapping.

This look-up table may be applied at a time of imaging to effect the metamer selection of color processor 220 and/or the method of FIG. 6. Entries in look-up table comprise nodes that define an NPac to be used to reproduce a color having a particular set of RGB co-ordinates, For any node indexed by a RGB value, the node contains an NPac that when halftoned over a unit area results in a colorimetry (e.g. a point in XYZ Yule-Nielsen space) that maps to the RGB color value. FIG. 10 shows by way of example an RGB space with a surface node N1 having coordinates R1, S1, B1 and an interior node N2 having coordinates R2, G2, B2. The nodes at the surface (of the cube in this example) may be regarded as being in a layer at the surface. Successive layers of nodes lie below the surface. Thus, the look-up table provides a discrete, non-continuous, representation of the colors to be imaged.

As shown in FIG. 10, each RGB color channel comprises a 8-bit value between 0 and 255, hence the RGB gamut volume is a cube. The gamut volume in NPac space is not so easily described and can be any arbitrary shape. The NPac value in each row of the look-up table is a vector quantity and describes the amount of each NP required over a set area to achieve the equivalent RGB color. The NPac vector consists of the area coverage required for each NP and is expressed as a value between 0 and 1.

Certain examples described herein provide greater robustness in imaging systems. For example, in the case of ink-jet color printers, printing can be performed more efficiently as certain methods disdosed herein can be used to accommodate increased printing fluctuations at higher speed printing. This may be achieved without higher cost hardware with smaller tolerances. Alternatively, certain methods disclosed herein can be used to maintain quality in a printing system that requires high accuracy and that is highly sensitive to hardware fluctuations. This may be useful in page-wide array architectures that lack the redundancy to hide print errors that result from perturbations and fluctuations, e.g. architectures that cannot output an image multiple times at a given location.

For example, comparing a robustness-maximized color separation, e.g. as implemented by the RGB-to-NPac color mapping described herein, with a color separation from a comparative imaging pipeline, within-die and die-to-die color errors are greatly reduced across multiple prints with the same image content. Certain methods described herein thus reduce both die-to-die color errors and the uncertainty of within-die variability, e.g. differences seen from halftone pattern to halftone pattern.

Certain examples described herein reduce artifacts in non-redundant printing architectures, which otherwise cannot be affected by color resources. This can result in an increased life-span of print heads and printer dies and an ability to deliver comparable print quality at a lower material cost. In certain case, the described examples can provide increased speed in printer architectures where redundancy is possible, by reducing a number of passes of one or more print heads in a scanning printer architecture at a given level of print quality. Certain examples described herein may also provide a static solution for robustness, instead of the dynamic, reactive alternatives that exist in redundant printing systems. Finally, the digital halftone patterns that result from the described examples are more robust when imaged under a variety of imaging system states.

Figure 11:
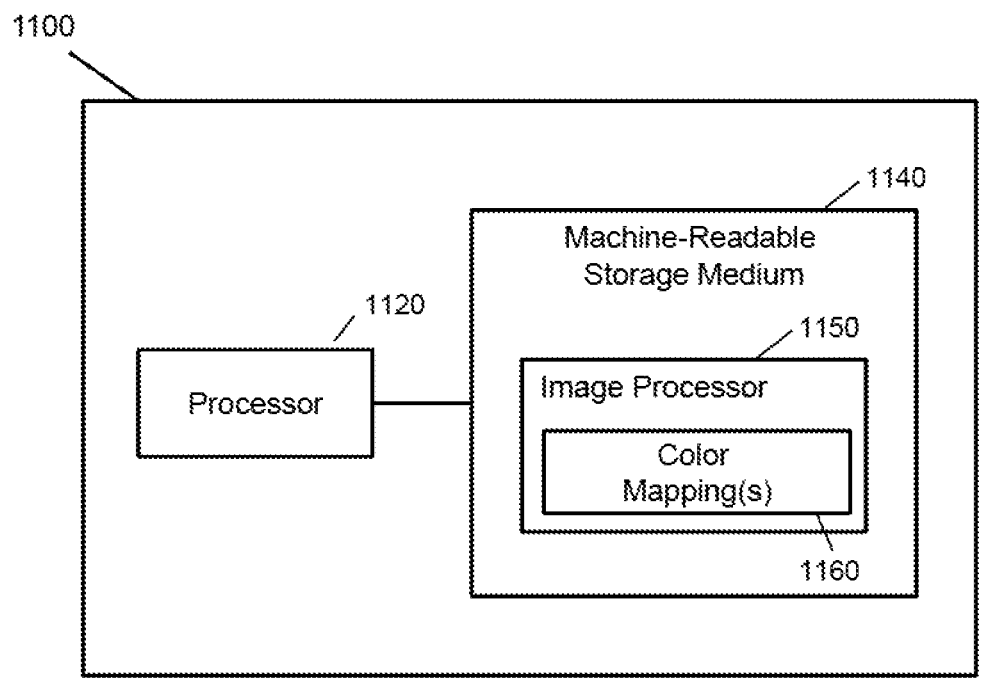
FIG. 11 is a schematic diagram showing an exemplary computer system according to an example.

Certain methods and systems as described herein may be implemented by a processor that processes program code that is retrieved from a non-transitory storage medium. FIG. 11 shows an example 1100 of a device comprising a machine-readable storage medium 1140 coupled to a processor 1120. The device may comprise a computer and/or an imaging device such as a printer. Machine-readable media 1140 can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 11, the machine-readable storage medium comprises program code to implement an image processor 1150 and data representative of one or more color mappings 1160. The image processor 1150 may implement one or more of the methods described above.

Similarly, it should be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer program code stored in (non-transitory) memory and executable by the processor, or by hardware, or by a combination of tangibly stored code and hardware (and tangibly stored firmware).

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
    accessing an imaging model for modeling perturbations of a printing device;
    obtaining parameters for color model, the color model indicating a color gamut for the printing device in a first color space; and
    determining a color mapping to a second color space for a plurality of sampled colors in the color gamut by:
        computing a set of metamers matching the sampled color, each metamer representing a color value in the second color space;
        for each metamer in the set of metamers, applying at least the imaging model with the perturbations to estimate a color error associated with the perturbations; and
        selecting a particular metamer for each sampled color based on the set of estimated color errors, wherein the particular metamer is used, in the second color space, as a color output for the sampled color in the color mapping;
    mapping a plurality of color values of an input image to a plurality of output colors using the determined color mapping; and
    printing the input image, by the printing device, using the output color values to which the color values of the input image have been mapped.

2. The method of claim 1 wherein each metamer comprises a Neugebauer Primary area coverage (NPac) vector.

3. The method of claim 1, wherein in the color model comprises application of one or more of the Kubelka-Munk, Neugebauer and Yule-Nielsen models.

4. The method of claim 1, wherein the sampled colors comprise a color value in a color space based on one of a Red, Green, Blue (RGB) color space, a Cyan, Magenta, Yellow, BlacK (CMYK) color space, an International Commission on Illumination (CIE) Lab color space and a CIE XYZ color space.

5. The method of claim 1, wherein constructing an imaging model comprises determining image characteristics comprising one or more of: dot size, dot shape, dot placement statistics and dot size variation statistics.

6. The method of claim 1, wherein the color error comprises a delta E color difference and a metamer that minimizes the delta E color difference is selected for the color mapping.

7. The method of claim 1, wherein applying at least the imaging model with the perturbations to estimate a color error comprises:
    applying the imaging model with a first set of operating parameters to generate a first simulated output and applying the imaging model with a second set of operating parameters to generate a second simulated output, one or more of the first and second set of operating parameters modeling the perturbations;
    applying the color model to the first and second simulated outputs to generate first and second estimated color values; and
    determining a color error between the first and second estimated color values.

8. A method comprising:
    receiving an image for output by a printing device, the image comprising a plurality of input colors;
    determining, for the printing device, a set of output colors corresponding to the input colors,
        the set of output colors being determined using a color mapping,
        each output color being selected based on a comparison of a color property for each of a plurality of metamers,
        each of the plurality of metamers mapping to a common input color,
        each comparison being based on at least an estimated color value of a selected metamer with a plurality of modeled perturbations of the printing device; and
    printing, by the printing device, the image using the determined set of output colors corresponding to the input colors.

9. The method of claim 8, wherein a metamer comprises a Neugebauer Primary area coverage vector.

10. The method of claim 8, wherein the set of output colors is determined from a look-up-table.

11. A system comprising:
    an imaging model arranged to model perturbations of a printing device;
    a color model arranged to indicate a plurality of output colors for the printing device; and a processor arranged to:
- compute a set of metamers for a plurality of sampled colors in a color gamut for the printing device;
- for each metamer in the set of metamers, apply at least the imaging model with the perturbations to estimate a color error associated with the perturbations;
- select a particular metamer for each sampled color based on the set of estimated color errors;
- generate a mapping of a plurality of color values of an input image to the output colors, using the particular metamer selected for each sampled color; and
- cause the printing device to print the input image using the output color values of the mapping.

12. The system of claim 11, wherein the imaging system is a halftone printing system and each metamer comprises an NPac vector.

13. The system of claim 11, wherein the color model comprises an application of one or more of the Kubelka-Munk, Neugebauer and Yule-Nielsen models.

14. The system of claim 11, wherein the mapping is an RGB-to-NPac mapping.

15. The system of claim 11, further comprising the printing device.

\* \* \* \* \*

UNITED STATES PATENT AND TRADEMARK OFFICE
CERTIFICATE OF CORRECTION

| | | |
|---|---|---|
| PATENT NO. | : 9,936,102 B2 | Page 1 of 1 |
| APPLICATION NO. | : 15/305627 | |
| DATED | : April 3, 2018 | |
| INVENTOR(S) | : Jan Morovic et al. | |

It is certified that error appears in the above-identified patent and that said Letters Patent is hereby corrected as shown below:

On the Title Page

Item (72), Inventors, in Column 1, Line 5, delete "San Cugat del Valles, ES" and insert -- Sant Cugat del Valles, ES --, therefor.

In the Claims

In Column 11, Line 67, in Claim 1, delete "mapping:" and insert -- mapping; --, therefor.

Signed and Sealed this
Twenty-first Day of August, 2018

Andrei Iancu
*Director of the United States Patent and Trademark Office*